3,157,609
TREATMENT OF SYNTHETIC RUBBER
Ralph E. McNay and William R. Peterson, Baytown, Tex., assignors, by mesne assignments, to Ashland Oil & Refining Company, Ashland, Ky., a corporation of Kentucky
No Drawing. Filed Dec. 12, 1960, Ser. No. 75,116
5 Claims. (Cl. 260—27)

This invention relates to the processing of synthetic rubber-like polymers. More particularly, it relates to a method of improving the processing characteristics of synthetic rubber-like polymers and the products obtained thereby.

In recent times, various types of synthetic rubber-like polymers have been prepared as potential replacements for natural rubber. Some of these have been received with enthusiasm while still others, in spite of their excellent physical characteristics, have met with difficulties because of poor mill processing behavior and/or lack of tack. For instance, stereoregular polybutadiene high in cis-1,4 structure is known to possess the excellent physical properties generally attributable to polybutadiene by whatever method prepared. Nevertheless, it is especially difficult to process particularly at temperatures above 110° F. Not only does the polymer band ineffectively and bank poorly on the mill, but the incorporation of pigments therein is not readily accomplished. Although these properties can be improved to some degree by milling cis-1,4 polybutadiene in the presence of a softener, any improvement demonstrated is marginal at best. Processing behavior has also been shown to be enhanced at above 110° F. by blending the polymer with natural rubber. The obvious drawback to this approach, however, is that any improvement realized is attained at the expense of using the very product which the polymer is intended to replace. Other synthetic rubber-like polymers are similarly plagued to one degree or another. For instance, while styrene-butadiene polymers usually can be readily compounded on a mill when the polymer Mooney viscosity is below about 35 ML–4, at increasingly higher Mooney levels milling becomes progressively more difficult.

It is a principal object of this invention, therefore, to provide a method for improving the characteristics of synthetic rubber-like polymers, particularly difficult to process polybutadiene and high Mooney styrene-butadiene polymers. It is a further object of this invention to provide a method for improving the mill processing behavior of such polymers. It is a still further object of this invention to provide a method for imparting to such polymers an improved quality of tack. Another object of this invention is to obtain such improved characteristics without sacrificing other polymer properties. Still another object is to provide an improved processing aid composition.

As discussed above, the use of rubber softeners or plasticizers as aids in the processing of natural and synthetic rubbers is well known. It has also been suggested that improved processing of normally difficult to process synthetic rubber-like polymers can be obtained by milling the polymer in the presence of a derivative of the plant Grindelia. It is quite unexpected, therefore, that a synergistic effect is obtained in accordance with this invention by the use of a composition comprising the two above described processing aids in the treatment of normally difficult to process synthetic rubber-like polymers. Accordingly, the method of this invention comprises, in general, the processing of a synthetic rubber-like polymer in the presence of an effective amount of a processing aid composition comprising a mixture of a derivative of the plant Grindelia and a rubber-softener or plasticizer, whereby improved processing and/or tack characteristics of a nature heretofore unattainable are imparted thereto. More particularly, the method comprises processing a polymer in the presence of a mixture which comprises an extract of the plant Grindelia which is soluble in both alcohol and hydrocarbon solvents, and a rubber softener of the class generally referred to as physical softeners.

Although the method of the present invention is particularly applicable to improving the processability and tack of stereoregular polybutadiene high in cis-1,4 structure, other synthetic rubber-like polymers may also be similarly treated so as to exhibit the same advantages to varying degrees. Thus, the method may also be practiced on polymers prepared by the emulsion polymerization of a polymerizable ethylenic compound either by itself or with one or more different polymerizable ethylenic compounds. By ethylenic compounds is meant, for example, conjugated diolefins such as butadiene-1,3, methyl-2-butadiene-1,3, chloro-2-butadiene-1,3, piperylene, 2,3-dimethyl butadiene-1,3, and the like; aryl olefins such as styrene, vinyl naphthlene, α-methylstyrene, p-chlorostyrene, vinyl toluene, divinyl benzene and the like; α-methylene carboxylic acids, their esters, nitriles and amides such as acrylic acid, methyl acrylate, methylmethacrylate, acrylonitrile, methacrylonitrile, acrylamide, methacrylamide and the like; vinyl aliphatic compounds such as the vinyl halides, vinyl acetate, methyl vinyl ether, methyl vinyl ketone and the like; and vinylidene compounds such as the vinylidene halides. Other well-known synthetic rubber-like polymers such as butyl rubber, silicone rubbers, chlorosulfonated polyethylene elastomers, polyurethane elastomers, fluoro elastomers, ethylene-propylene copolymers, and the like may also be treated with advantage according to the method of this invention. Accordingly, as used throughout the specification and claims, the term synthetic rubber-like polymer is intended to include all of the above.

The plant Grindelia from which one of the components of the synergistic processing aid mixture of the method of this invention is derived belongs to the tribe Asteroideae of the natural family Compositae. The genus Grindelia includes some 25 known species, six or eight of which are found in South America. The remainder occur in the United States mostly west of the Mississippi River, generally in arid and semi-arid plateau regions, although certain species also appear in regions where rain-fall is more plentiful. A particularly prevalent plant in the United States is the species *G. squarrosa*, commonly referred to as "curly cup gumweed." Other well known species are *G. humilis, G. Camporum, G. robusta, G. nana, G. fastigiata, G. perennis* and *G. blakei*, among others. The various species are perennial or biennial and produce, in varying amounts depending on the species, a sticky resinous substance on the stem and leaves and especially on the flower heads. From this characteristic is derived the common name "gum plant" or "gum weed." Extracts of the plant have been shown to exhibit some utility in certain areas of the pharmaceutical field, but beyond this there has apparently been no further investigation of the plant for any purpose.

The derivative from the plant Grindelia may be obtained by conventional extraction means. Thus, the finely pulverized plant including leaves, flower heads and stems, is simply leached by percolating therethrough any common hydrocarbon solvent such as VM & P naphtha. The extract is a soft, light amber colored, resinous substance which is substantially soluble in alcohol. This resinous substance, as such or as a water soluble salt thereof such as the sodium, potassium and ammonium salts, may be employed for the purposes of this invention. It has been shown, however, that the extract contains approximately 10% of an alcohol-insoluble material which, if separated as by subjecting the resinous substance to further extraction, renders the synergistic mixture of this invention an even superior processing aid. It is a preferred embodiment of this invention, therefore, to employ in admixture with physical softener a hydrocarbon solvent extract of the plant Grindelia which has been purified by further extraction with alcohol.

The following example illustrates the extraction of the plant Grindelia. All parts are by weight unless otherwise noted.

EXAMPLE 1

1000 parts of the whole plant *G. squarrosa* are pulverized with a hammer mill and subjected to extraction by simple percolation at room temperature with 2000 parts of commercially available VM & P naphtha. After 30 minutes, the resultant slurry is filtered and the filtrate subjected to distillation to remove the solvent, leaving 120 parts of a resinous substance. 100 parts of the resinous substance is then dissolved in 900 parts of methyl alcohol and the resultant slurry filtered to give 92 parts of purified product. The water soluble salts of the product may be obtained in a conventional manner.

The softener which comprises the other component of the synergistic composition of this invention is selected from those materials usually referred to in the rubber industry as physical softeners as contrasted to chemically active plasticizers or peptizers. As outlined in "Introduction to Rubber Technology," edited by Maurice Morton and published by Reinhold Publishing Corp., 1959, physical softeners may be considered to act in the manner of intermolecular lubricants. A wide variety of materials which act in this manner are commercially available to the rubber trade. Many of these are of a proprietary nature whose compositions are sometimes not clearly specified. Such physical softeners, however, can be helpfully classified according to their sources. Thus, physical softeners may broadly be classified as petroleum derivatives such as naphthenic, aromatic and highly aromatic oils, resins, waxes, asphalts and the like; pine tree derivatives such as pine tar, pitch, resins and the like; coal tar products such as coal tar oils, pitch, resins and the like; and natural fats and oils such as vegetable oils, fatty acids and the like; as well as various synthetic organic compounds. These classes of softeners are well known in the art and certain softeners in certain of the classes have received wide commercial acceptance. While the practice of this invention may employ a synergistic composition containing a softener from any of the classes above, a preferred embodiment comprises a composition in which the softener is a petroleum derivative particularly a highly aromatic oil as represented by Philrich 5, a product of Phillips Petroleum Company; an aromatic oil as represented by Sundex 53, a product of Sun Oil Company; or a naphthenic oil as represented by Circosol 2XH, a product of Sun Oil Company.

The amount of processing aid employed in accordance with this invention may be quite widely varied. The actual amount employed in any particular case will depend to some extent on the polymer being treated. In general, it can be stated that the amount of processing aid may be as little as about 1 or 2% on the weight of the polymer under which conditions a decided advantage is exhibited even with extremely difficult to process polymers such as stereoregular cis-1,4 polybutadiene. Usually, the practice will be to employ the processing aid in amounts ranging considerably higher, even as high as about 25 or 30% by weight. In most instances, however, the processing aid will be employed in an amount of about 5–15% on the weight of the polymer, in which range a decided improvement will be exhibited in process milling and/or tack properties and/or, in some instances, physical properties of the subsequently compounded and/or vulcanized products.

In accordance with the present invention, the ratio of components in the synergistic mixture may vary and will depend to some extent upon the particular physical softener employed as well as the particular polymer being treated. The ratio of physical softener to Grindelia derivative, however, should be at least about 1.5:5:10 by weight and may range to as high as about 10:1.5. Preferably, however, the softener and Grindelia extract are employed in a ratio range of about 4:6–6:4 by weight.

The components of the processing aid composition may be incorporated into the polymer to be treated either separately or as a preformed mixture. In either event, the incorporation may be conducted in various ways. Thus, the incorporation may be made directly on the mill or in liquid form sprayed or otherwise applied to the polymer. In the case of emulsion polymers, the processing aid may be added directly to the latex prior to coagulation, it being incorporated in the polymer as it is coagulated and separated. In solvent polymerization systems, the processing aid in liquid form may be added directly to the solvent system for incorporation into the resultant polymer. Any or all of these or other methods of addition may be employed in the practice of this invention.

The following examples further illustrate the invention. All parts are by weight unless otherwise noted. In these examples, the polymers are observed during treatment as to milling behavior, i.e., the ability to mill readily and easily without bagging and without excessive sticking. In addition, milled polymers are observed as to their property of tack, i.e., that characteristic which causes a polymer to adhere to itself which is so essential in the construction of composite articles such as tires. The milled polymers are also observed as to their property of extrusion, i.e., their ability to extrude uniformly with a smooth surface and with sharp edges. In the following examples the letters E, G, F and P specifying Excellent, Good, Fair and Poor are used to express these properties.

EXAMPLE 2

100 parts of stereoregular polybutadiene high in cis-1,4 structure having a Mooney viscosity of 40 ML–4 are passed twice, without banding, through a 6 x 12 inch roll set at 0.008 inch and maintained at a temperature of 120–130° F. The polymer is then banded on the front roll with the mill set at 0.055 inch and ¾ cuts made from alternate sides at 30 second intervals for a period of two minutes. Processing aid according to Table I is then added evenly across the mill over an additional two minute period followed by the addition at uniform rate of 50 parts of carbon black. The mill is opened to 0.065 inch after half of the black is added and one ¾ cut made from each side. Addition of the black requires 12 minutes. The mill is then opened to 0.075 inch and a ¾ cut made from each side. The following compounding ingredients are then added over a period of four minutes.

| Ingredient: | Parts |
| --- | --- |
| Zinc oxide | 12 |
| Sulfur | 7 |
| Stearic acid | 4 |
| Antioxidant | 4 |
| Accelerator | 3.6 |

After addition is complete, three ¾ cuts are made each way over a period of two minutes. The batch is then cut from the mill, the mill set at 0.030 inch, and the rolled strip passed through the mill end wise six times over a two minute period. The mill is then opened to 0.25 inch and the stock passed through four times in 30 seconds, the stock being folded back on itself each time. Mill processing and tack properties of the treated polymer appear in Table I.

*Table I*

|  | Sample No. | | | |
|---|---|---|---|---|
|  | 1 | 2 | 3 | 4 |
| Polymer | 100 | 100 | 100 | 100 |
| Philrich 5 [1] |  | 15 |  | 7.5 |
| Product of Example 1 |  |  | 15 | 7.5 |
| Milling | P | P | G | E |
| Tack | P | P | G | E |

[1] Product of Phillips Petroleum Company.

EXAMPLE 3

The procedure of Example 2 is repeated except that the ratio of components in the synergistic composition is changed to 3 parts of Philrich 5 to 12 parts of the product of Example 1. Substantially as good milling and tack properties are exhibited. When the ratio is reversed to 12:3 of Philrich 5 to the product of Example 1, improved mill processing and tack are observed as compared to the use of either alone but not to the same extent as when the ratio is 3:12 or 7.5/7.5.

EXAMPLE 4

The procedure of Example 2 is repeated except that the product of Example 1 is employed in the form of its sodium salt. Similar improved results are observed.

EXAMPLE 5

The procedure of Example 2 is repeated on 100 parts of an emulsion polymerized polybutadiene polymer of 32 ML-4 Mooney viscosity using processing aids as indicated in Table II. The substantially improved milling and tack properties are shown in Table II.

*Table II*

|  | Sample No. | | | |
|---|---|---|---|---|
|  | 1 | 2 | 3 | 4 |
| Polymer | 100 | 100 | 100 | 100 |
| Philrich 5 |  | 15 |  | 7.5 |
| Product of Example 1 |  |  | 15 | 7.5 |
| Milling | P | P | G | E |
| Tack | P | P | G | E |
| Extrusion | P | P-F | F-G | G |

EXAMPLE 6

Similar results are obtained when Example 5 is repeated replacing Philrich 5 by Sundex 53 and Circosol 2XH, both products of Sun Oil Company.

EXAMPLE 7

A 70 ML-4 Mooney viscosity styrene-butadiene latex prepared at 41° F. using a mixed fatty-rosin acid soap system is masterbatched in sufficient quantity with 75 parts of HAF carbon black giving, when coagulated, a black masterbatch containing 100 parts of polymer. The milling procedure of Example 2 is repeated using 10 parts of zinc oxide, 2 parts of sulfur, 1.75 parts of benzothiazyldisulfide and processing aids as indicated in Table III. Results appear in Table III.

*Table III*

|  | Sample No. | | | |
|---|---|---|---|---|
|  | 1 | 2 | 3 | 4 |
| Polymer | 100 | 100 | 100 | 100 |
| Philrich 5 |  | 15 |  | 7.5 |
| Product of Example 1 |  |  | 15 | 7.5 |
| Milling | P | P | G | E |
| Tack | P | P | G | E |
| Extrusion | P | P | G | E |

EXAMPLE 8

The procedure of Example 7 is repeated except that in Samples 2 and 4, the physical softener is added to the latex along with the carbon black. Similar results are obtained.

EXAMPLE 9

When Example 7 is repeated replacing Philrich 5 with equivalent parts of pine tar and of Hercules Powder Company's Dresinate 731D, an alkali metal salt of a rosin acid, improved milling and tack properties are observed but in neither case is the improvement as apparent as in Example 7.

EXAMPLE 10

To 100 parts of Hypalon-20 (E. I. du Pont de Nemours & Co. chlorosulfonated polyethylene), broken down by milling at 120° F. for two minutes, is added on the mill processing aids as indicated in Table IV over five minutes, and 29 parts of carbon black added over ten minutes. The following compounding ingredients are then added over an additional ten minutes of milling.

Ingredient: Parts
    Magnesium oxide _____ 4
    Antioxidant _____ 1
    Zinc oxide _____ 5
    Stearic acid _____ 0.5
    Accelerator _____ 0.5

Results appear in Table IV.

*Table IV*

|  | Sample No. | | | |
|---|---|---|---|---|
|  | 1 | 2 | 3 | 4 |
| Polymer | 100 | 100 | 100 | 100 |
| Philrich 5 |  | 7.5 |  | 7.5 |
| Product of Example 1 |  |  | 7.5 | 7.5 |
| Milling | G | G | G | G-E |
| Tack | F | F | G | G-E |
| Extrusion | P | F | G | G-E |

EXAMPLE 11

100 parts of Viton-A (an E. I. du Pont de Nemours & Co. vinylidene fluoride) is milled as in Example 9 but on a cold mill at 60–75° F. using the following compounding ingredients and the processing aids of Table V.

Ingredient: Parts
    Magnesium dioxide _____ 15
    Carbon black _____ 25
    Curing agent _____ 1.5

Results appear in Table V.

*Table V*

|  | Sample No. | | | |
|---|---|---|---|---|
|  | 1 | 2 | 3 | 4 |
| Polymer | 100 | 100 | 100 | 100 |
| Philrich 5 |  | 2.5 |  | 2.5 |
| Product of Example 1 |  |  | 2.5 | 2.5 |
| Milling | P | F | G | E |
| Tack | P | F | G | G |
| Extrusion | F-G | G | G | G |

It should be understood that while the above examples have specified the presence of carbon black, that similar synergistic effects are observed when the examples are conducted in the absence of carbon black to produce white rubber. Similarly, when polybutadiene high in cis-1,4 structure is blended with natural rubber to improve its milling properties, a synergistic effect is also observed when the blend is processed in the presence of the processing aid composition of this invention. It should further be noted that while the examples have illustrated the use of a derivative of the specie *G. squarrosa*, derivatives of the other species of the genus Grindelia are just as applicable and form a part of this invention as do physical softeners other than those specifically illustrated.

We claim:

1. In the processing of a solid synthetic rubber polymer, the method of imparting improved processing characteristics to said polymer which comprises: adding to the polymer as a processing aid about 1.0–30% by weight of the polymer of a combination consisting essentially of a physical rubber softener selected from the group consisting of an aromatic petroleum oil, pine tar and rosin acid soap and a hydrocarbon soluble extract of the plant Grindelia obtained by extracting said plant with a hydrocarbon, said softener and said extract being in a ratio by weight of about 10:1.5–1.5:10, and processing the resultant mixture comprising said solid polymer and said processing aid.

2. In the processing of a solid synthetic rubber polymer, the method of imparting improved processing characteristics to said polymer which comprises: adding to the polymer as a processing aid about 1.0–30% by weight of the polymer of a combination consisting essentially of a physical rubber softener selected from the group consisting of an aromatic petroleum oil, pine tar and rosin acid soap and a hydrocarbon soluble-alcohol soluble extract of the plant Grindelia obtained by extracting said plant with a hydrocarbon and extracting the resulting hydrocarbon soluble extract with alcohol, said softener and said extract being in a ratio by weight of about 10:1.5–1.5:10, and processing the resultant mixture comprising said solid polymer and said processing aid.

3. The process of claim 1 in which the amount of processing aid is about 5.0–15% by weight of said polymer.

4. The process of claim 1 in which the extract is employed as a salt selected from the group consisting of the alkali metal and ammonium salts.

5. The process of claim 1 in which the polymer is stereo-regular polybutadiene.

References Cited by the Examiner
UNITED STATES PATENTS

| | | | |
|---|---|---|---|
| 2,384,910 | 9/45 | Hanson et al. | 260—27 |
| 2,415,541 | 2/47 | Soday | 260—33.6 |
| 2,556,575 | 6/51 | Cubberley et al. | 260—8 |
| 2,822,341 | 2/58 | Miller et al. | 260—23 |
| 2,864,882 | 12/58 | Snell | 260—27 |
| 2,868,741 | 1/59 | Chambers et al. | 260—8 |
| 2,956,973 | 10/60 | Holdsworth | 260—8 |

OTHER REFERENCES

Whitby et al.: Synthetic Rubber, 1954, John Wiley & Sons Inc., New York, page 219.

LEON J. BERCOVITZ, *Primary Examiner.*

A. D. SULLIVAN, *Examiner.*

UNITED STATES PATENT OFFICE
CERTIFICATE OF CORRECTION

Patent No. 3,157,609                          November 17, 1964

Ralph E. McNay et al.

It is hereby certified that error appears in the above numbered patent requiring correction and that the said Letters Patent should read as corrected below.

Column 4, line 19, for "1.5:5:10" read -- 1.5:10 --; column 5, line 27, for "5 to 12" read -- 5 and 12 --.

Signed and sealed this 10th day of May 1966.

(SEAL)
Attest:

ERNEST W. SWIDER                          EDWARD J. BRENNER
Attesting Officer                             Commissioner of Patents